INVENTORS
VERL L. TAYLOR
MORRIS W. BARNHART
BY Fraser and Bogucki
ATTORNEYS

Aug. 25, 1970 V. L. TAYLOR ET AL 3,525,813
AUTOMATIC FRAME SYNCHRONIZER FOR A SEQUENTIAL INFORMATION SYSTEM
Filed May 9, 1966 3 Sheets-Sheet 2

INVENTORS
VERL L. TAYLOR
MORRIS W. BARNHART
BY Fraser and Bogucki
ATTORNEYS

INVENTORS
VERL L. TAYLOR
MORRIS W. BARNHART
BY
Fraser and Bogucki
ATTORNEYS 3,525,813
Patented Aug. 25, 1970

3,525,813

AUTOMATIC FRAME SYNCHRONIZER FOR A SEQUENTIAL INFORMATION SYSTEM

Verl L. Taylor, Costa Mesa, and Morris W. Barnhart, Anaheim, Calif., assignors, by mesne assignments, to Lear Siegler, Inc., Santa Monica, Calif., a corporation of Delaware Filed May 9, 1966, Ser. No. 548,744
Int. Cl. H04j 3/06
U.S. Cl. 179—15 13 Claims

ABSTRACT OF THE DISCLOSURE

A frame synchronizer for a telemetry signal decommutator which operates in one of three modes and which automatically operates at an optimum level of performance. Counters are provided for the temporary storage of parameters which determine whether the synchronizer is to advance or revert from one operating mode to another. Means responsive to the actual errors encountered in the received data are utilized to change the stored parameters from time to time thereby automatically adapting the synchronizer to the quality of the received data signal.

This invention relates to communication systems in which information is transmitted sequentially in a cyclic presentation, and more particularly to systems of the type described which may be employed in space vehicle telemetry or the like.

Telemetry involves the transmission of data derived from sensors indicating local conditions for presentation at a remote location. Telemetry is commonly used in communication with space vehicles, particularly orbiting satellites and probes, to provide the necessary information at a ground station for the control or direction of operations aboard the vehicle. In such uses, a radio link is a necessary part of the communications path. Radio links are customarily subject to loss or distortion of signal through fading, interference, mutilation or the like, all of which may be referred to as noise. In particular, in telemetry from deep space probes, the very distances involved strain to the utmost the capability of the radio link as a part of the communication path. Corresponding problems affecting the quality of the telemetry signals received from an orbiting space vehicle as it passes through the range of one ground station after another are encountered. Particular types of radio carrier modulation are preferred for telemetry systems of the type described. Using pulse code modulation (PCM), for example, and with a sophisticated receiving system, it is possible to detect the presence of a signal which is as low as $\frac{1}{10}$ the amplitude of the noise present at the receiver.

In preferred telemetry systems in present use, the data gathered from the various sensors which detect conditions in the spacecraft are commutated and encoded for transmission in the spacecraft. The commutation process selects time-sequential segments of the sensor condition signals, thus ordering the presentation of the respective data, and also inserts a particular recognition pattern called a "sync word" in the transmitted data so that equipment on the ground, programmed in advance in accordance with the order of the data to be presented, will be able to identify the particular data according to its origin as an indication of a specific condition on the spacecraft. In general, the transmitted signals are cyclic and repetitive in the sense that the sequence is repeated over and over, although each cycle contains a constant portion (the sync word) and a portion of comparatively random data representing the sensor signals which are variable from cycle to cycle. A complete series of the ordered data, including the sync word, is referred to as a frame. The commutator in the spacecraft operates at a preset frequency or sensor rate and is followed by a decommutator coupled to the receiver at a ground station so that the transmitted telemetry information can be decommutated in phase synchronization in the same order as it was commutated in the spacecraft. The decommutator contains a frame synchronizer having the capability of looking at an entire frame of received information and controlling the decommutator accordingly. In effect, the frame synchronizer searches for the sync word in order that the beginning and end of a particular frame may be identified and signals the decommutator to begin operating when frame synchronization is achieved.

Such a frame synchronizer has three modes of operation: (1) a SEARCH mode in which the sync word is not yet identified and the frame synchronization is of no consequence; (2) a VERIFY mode in which tentative synchronization is established after the sync pattern has been detected with some permissible degree of uncertainty; and (3) a LOCK mode in which frame synchronization is established with certainty and the decommutator is actuated to provide output data.

Because of the generally poor or variable conditions which are present in the transmission of the telemetered signals and the presence of noise in such signals, the frame synchronizer is programmed on the basis of the statistical probability of encountering errors (i.e., noise) in the sync word to be detected so that the mechanism will operate with what is hoped to be optimum level in controlling the decommutator to reproduce with accuracy the data corresponding to conditions existing in the space vehicle. Thus, in equipment which is presently known and used, variable settings are "cranked in" to the device to control the way in which it responds to what may be errors in received telemetry signals for each of the various modes of operation. For the SEARCH mode a particular number of random errors may be preset so that a signal which differs from the actual sync word by such a number is still recognized as the sync word. For the VERIFY mode in which the frame synchronizer looks only at the "window time," that is, the particular portion of the frame at which the sync word is expected, a "verify length" corresponding to a number of frames is preset which requires the frame synchronizer to detect that preset number of acceptable or good sync patterns without an unacceptable one in order for the device to advance to the LOCK mode. Similarly, for operation in the LOCK mode a "lock length" period is preset which determines the number of consecutive unacceptable or bad sync words which may be detected at the window time before the frame synchronizer is switched out of the LOCK mode to begin searching again. If an acceptable sync word is detected in the lock length period, the count of unacceptable sync words begins anew. These numbers are set by an operator, as indicated, based on the statistical probability of encountering various errors in the telemetered signals, which, in turn, depends upon the quality of the transmission path, including the extent of the interference from noise. It will be appreciated that the particular conditions may vary rapidly depending upon the motion of the space vehicle, the presence and types of interference and the like. Thus, not only is an operator required to set the conditions under which the frame synchronizer will be controlled, but the operator must be skillful enough to make changes in these settings from time to time in accordance with changes in the quality of the received signals in order to achieve optimum operation. Needless to say, such systems as are presently known, which rely upon an operator for this purpose, are not maintained to operate on an optimum basis under all conditions.

It is, therefore, a general object of the present invention to provide an improved frame synchronizing device of the type described.

It is a further object of the present invention to provide a frame synchronizer for a telemetry signal decommutator which automatically operates at an optimum level of performance.

It is also an object of the present invention to provide a frame synchronizer for controlling a telemetry signal decommutator at an optimum level of operation without the attention of an operator to maintain such optimum operation.

In brief, the particular arrangements in accordance with the present invention relate to a frame synchronizer device for a telemetry signal decommutator which is operable in one of three modes, SEARCH, VERIFY and LOCK, which is programmed to select automatically the permissible number of errors in the sync pattern for it to advance from SEARCH mode to VERIFY mode, the number of acceptable sync patterns it must recognize before it advances to the LOCK mode, as well as to control automatically the conditions under which it will revert from VERIFY or LOCK mode to the SEARCH mode; moreover, these arrangements in accordance with the invention are arranged to change the parameters set forth in order to conform to the quality of the data being processed. Various counters and registers are employed to keep track of the number of errors encountered from frame to frame. Certain of these counters provide temporary storage for the particular parameters which determine whether the frame synchronizer is to advance or revert from one operating mode to another. On the basis of the actual errors which are encountered, the particular arrangements of the invention provide for the changing of the corresponding parameters from time to time depending upon the quality of the data received. As a consequence, all that is required in the operation and control of frame synchronizers in accordance with the invention is the initial setting of the parameters which control its operation; thereafter, the control is automatic in accordance with the invention to achieve the desired optimum level of operation.

A better understanding of the invention may be had from a consideration of the following detailed description of the invention taken in conjunction with the following drawings, wherein.

Figure 4:
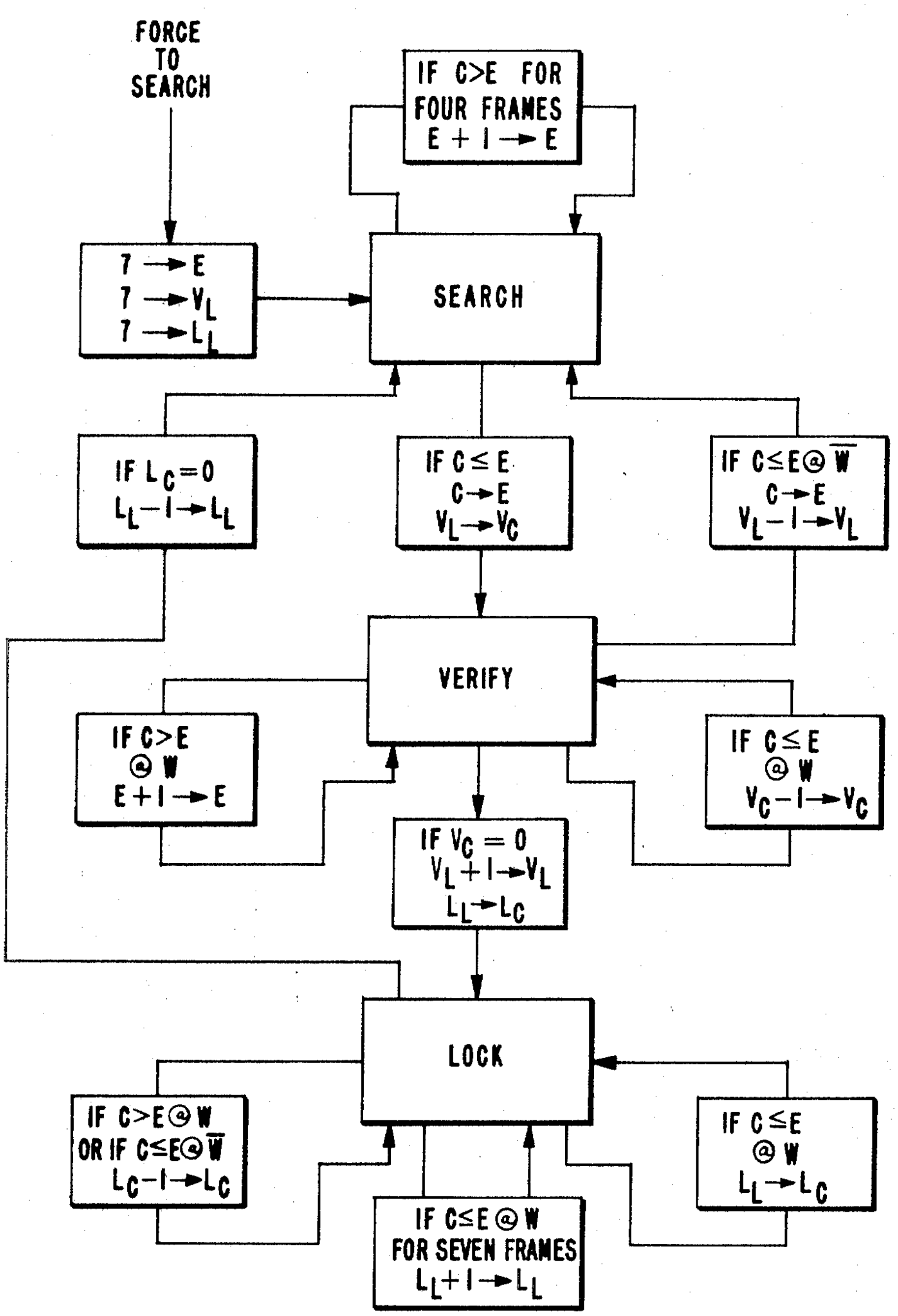
Figure 5:
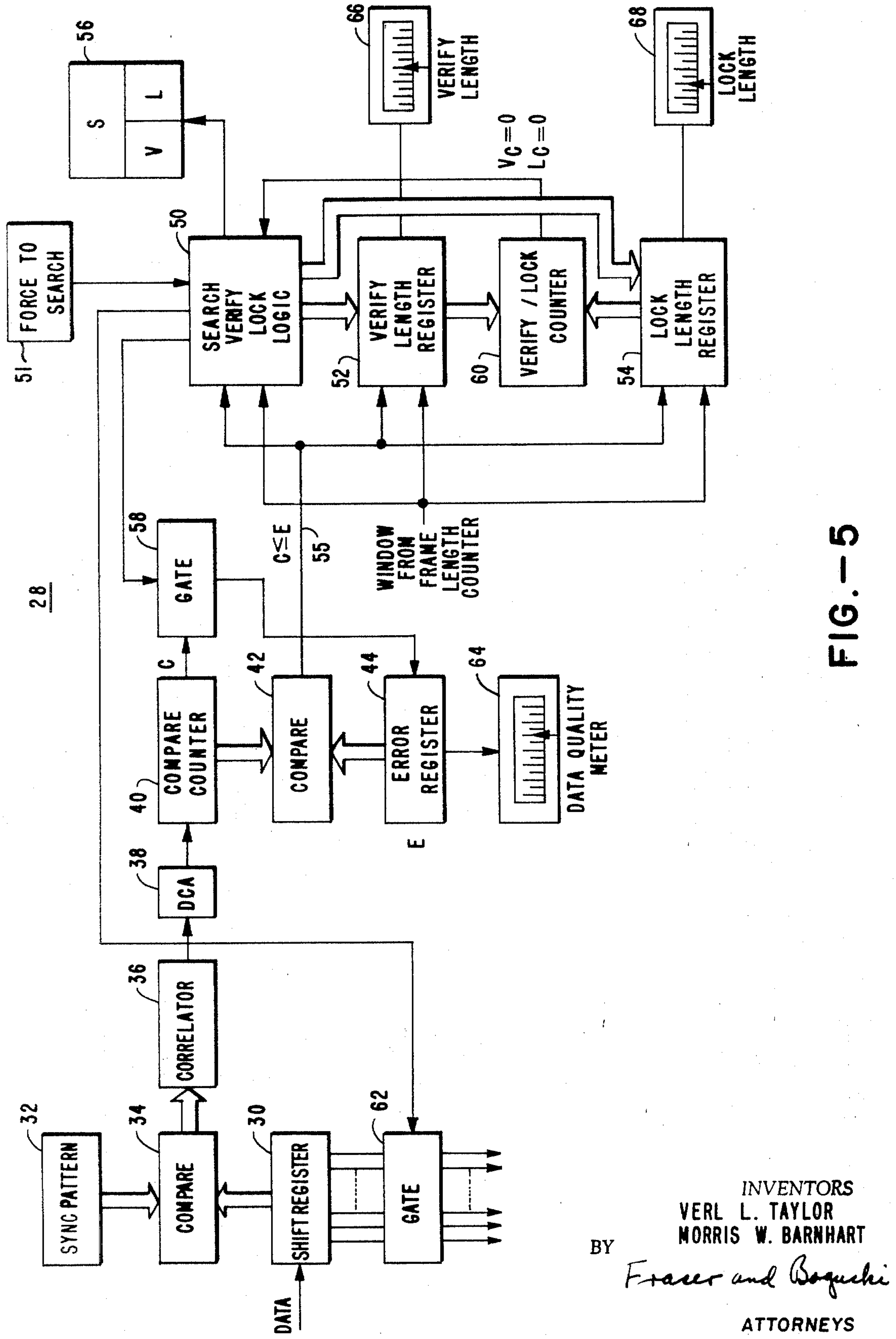

FIG. 4 is a block diagram (sometimes referred to as a flow diagram) showing the modes of operation and the various conditions under which particular changes may take place in a frame synchronizer in accordance with the invention; and FIG. 5 is a block diagram representing circuitry of a particular frame synchronizer in accordance with the invention which is operable in the manner depicted in the diagram of FIG. 4.

Figure 1:
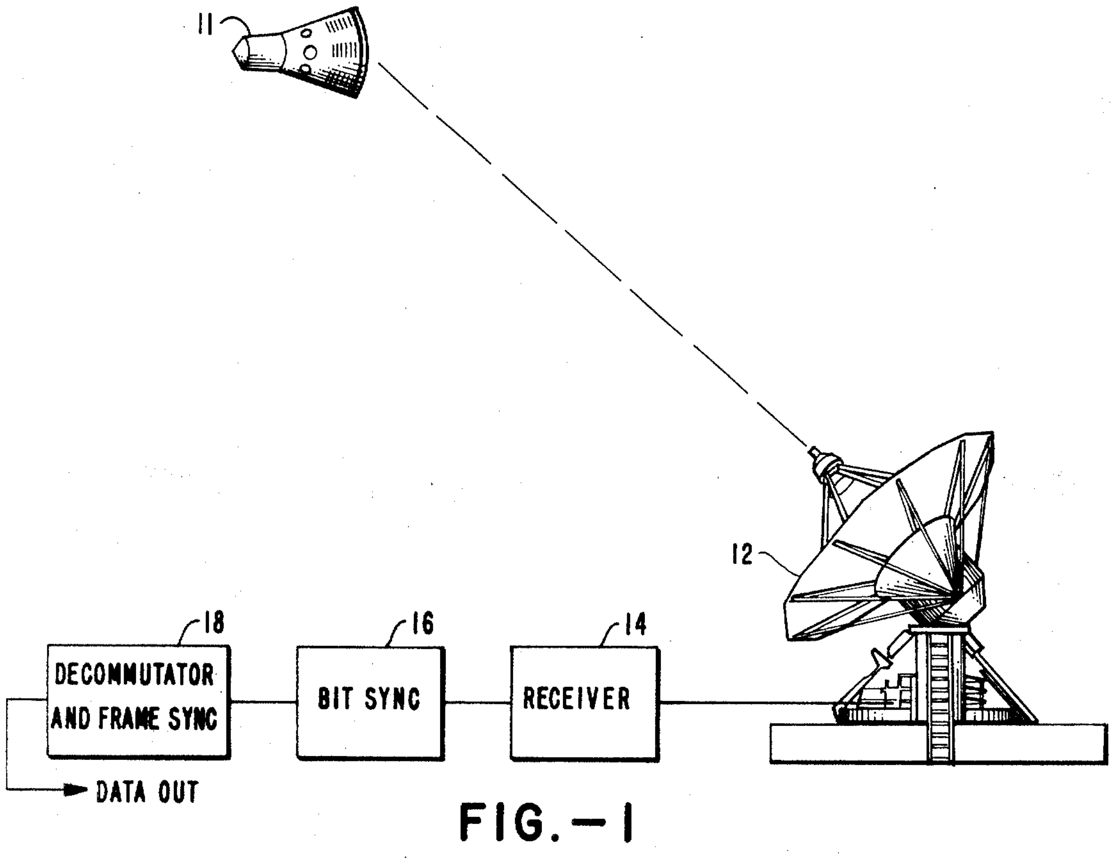
FIG. 1 is a block diagram representing in generalized form the pertinent portions of a telemetry system to which the present invention pertains.

FIG. 1 represents a typical telemetry system in general form and shows a space vehicle 11 in radio communication with a ground station which contains an antenna 12, a receiver 14, a bit synchronizer 16 and a decommutator and frame synchronizer stage 18, all connected in line. In such a system, the decommutator of the stage 18 is synchronized with the bit pulses received from the space vehicle 11 by the bit synchronizer 16. Thereafter, the frame synchronizer of the stage 18 endeavors to establish frame synchronization with the transmitted data and, when the decommutator becomes locked onto the received data, the data is passed from the stage 18 to display equipment and other apparatus for making use of the data.

Figure 2:
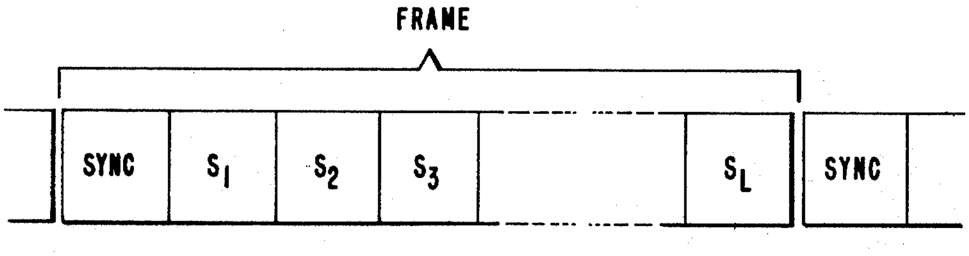
FIG. 2 is a representation of a telemetry presentation for the purpose of illustrating the operation of the invention.

FIG. 2 illustrates the sequence of received telemetry data as it is generated by the space vehicle 11. The data is commutated in a predetermined order with a particular sync pattern (sync word) being addded to identify the start of a given sequence. Each complete sequence of data comprising both the random sensor information and the associated sync pattern is referred to as a frame. Thus, the telemetry signals constitute a succession of frames, each beginning with a constant sync pattern (varied only by noise interference) and followed by signals $S_1$, $S_2$, $S_3$ . . . $S_L$ indicating respectively the instantaneous conditions of the various sensors aboard the space vehicle which are transmitted in the predetermined sequence. When the signal corresponding to the last sensor in the sequence is transmitted, a succeeding frame is started with the sync pattern and the succeeding sequence of signals from the sensors $S_1$, $S_2$, $S_3$, etc. Transmission of telemetry data in time division multiplex in this fashion is economical in the use of radio channels and in equipment which is necessary for the telemetry system, but it is essential that appropriate synchronization, particularly with respect to the individual frames, be maintained between the commutator in the space vehicle and the decommutator at the ground station if complete garbling of the telemetered data is to be avoided.

Figure 3:
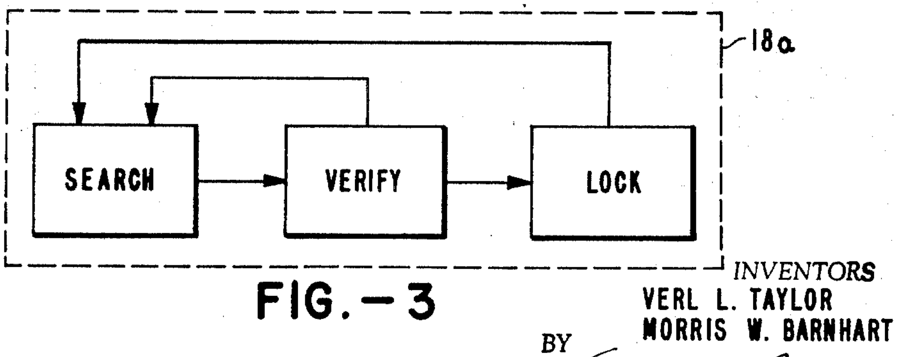
FIG. 3 is a block diagram illustrating the modes of operation and permissible transitions of a typical frame synchronizer of the type described.

FIG. 3 illustrates in block diagram form the modes of operation and the possible transitions between them of a preferred arrangement of a frame synchronizer **18*a* which may be employed to control the decommutator of the stage 18. Initially as telemetry signals are received by a particular ground station, the frame synchronizer begins operation in the SEARCH mode to look for the sync pattern of each individual frame of the telemetry signal. Eventually it tentatively identifies a particular pattern which may be the frame sync pattern for which it is searching. Upon such a recognition, the frame synchronizer 18*a* transfers to the VERIFY mode in which it checks to determine if the sync pattern tentatively identified is actually a true sync pattern. If the sync pattern which had been tentatively identified turns out not to have been the actual frame sync pattern, the frame synchronizer 18*a* returns to the SEARCH mode and continues looking for a frame sync pattern. However, if while in the VERIFY mode the frame synchronizer 18*a* determines that the tentatively identified frame sync pattern is a true sync pattern, it advances to the LOCK mode and controls a gate associated with the decommutator of the stage 18 to begin turning out the data which is being received from the space vehicle. While the frame synchronizer is in the LOCK mode, it continues checking each frame sync pattern to assure that synchronization is maintained. In the event that distortion of the transmitted signals results in what appears to be a loss of the sync pattern, the frame synchronizer 18*a* transfers to the SEARCH mode to again locate the sync pattern and establish frame synchronization in the manner just described. In the described arrangement, only when the frame synchronizer 18*a* is in the LOCK mode is output data permitted to be passed from the decommutator of the stage 18**.

Each of the conditions permitting a transition from one mode to another in the frame synchronizer 18*a* has been arbitrarily established. Bearing in mind that the system is designed to operate with very weak signals, often in the presence of substantial noise, it will be appreciated that recognition of a given sync pattern is best approached on a statistical basis in which certain errors in a given sync pattern may be tolerated and with the sync pattern being at least tentatively recognized as such, even in the absence of a complete match with a true pattern. Depending upon the condition of the received signal, the extent of tolerable mismatch will vary and the optimum permissible deviation will vary from time to time. Thus, although a frame synchronizer may be set to perform a mode transition upon the occurrence of a certain number of errors which may be encountered in the telemetry signal, previously known frame synchronizers have been equipped to permit an operator to dial into the equipment various error numbers which control the transition of the frame synchronizer depending upon the quality of the telemetry signal at a given time. Such control by an operator is only exercised intermittently, rather than on a frame-by-frame basis, and it of course requires operator attention. Typically it involves setting the frame synchronizer for operation in the SEARCH mode by dialing in a selected number of random errors. When the sync pattern is detected by the establishment of a match or correlation with a true sync pattern within the range of the present random errors, the frame synchronizer transfers to the VERIFY mode during which the synchronizer only looks at what is referred to as the "window time," that is, the time during which the sync pattern, as tentatively identified, should appear in a given frame. In order to establish verification, it is required that the frame synchronizer identify as an acceptable sync pattern every pattern received at window time within a preset period, which is referred to as the "verify length." If an unacceptable pattern is received at window time within the verify length period, the frame synchronizer reverts to the SEARCH mode. Upon completing verification, the frame synchronizer transfers to the LOCK mode in which it again looks at each frame only at the window time. The frame synchronizer transfers out of the LOCK mode if it sees only bad sync patterns at the window time within a preset period referred to as the "lock length." It will be appreciated that operation in this fashion can only continue on an optimum basis if the inserted numbers determining the acceptable errors, the verify length and the lock length are continually varied in accordance with the varying quality of the telemetry signal.

FIG. 4 illustrates a flow diagram of a particular frame synchronizer in accordance with the invention which may be employed to control the decommutator in the stage 18 of FIG. 1. In this diagram, the SEARCH, VERIFY and LOCK mode stages will be recognized as corresponding to the stages shown in FIG. 3. However, interim blocks are shown associated with these stages to represent the various conditions under which transitions between modes may occur and also to indicate particular changes of control conditions which take place in accordance with the invent upon the occurrence of particular preconditions.

As will be described in greater detail in connection with FIG. 5, particular arrangements in accordance with the invention incorpate a number of registers which store numbers which control the operation of the frame synchronizer in accordance with the invention to proceed at an optimum basis, which optimum operation is continuously related to the quality of the received signal. As a beginning, the operation begins in the SEARCH mode with a random error (E) register, a verify length ($V_L$) register and a lock length ($L_L$) register arbitrarily preset with the number 7, selected for purposes of illustration only. The application of a force to search signal, as by pressing a start button, sets the frame syuchronizer in the SEARCH mode under the control of the E, $V_L$ and $L_L$ registers containing the number 7–7–7. As the telemetry data is received, a compare (C) counter continuously counts the errors representing the degree of mismatch between the received data and the true cync pattern with which the received data is compared in the search for the frame sync word. As long as the errors counted in the C counter are greater than the number (7) contained in the E register, the frame synchronizer cannot transfer from the SEARCH to the VERIFY mode. However, in order that such a situation does not operate to preclude the system from ever becoming frame synchronized, the number in the E register is increased by one periodically until an acceptable number of errors is encountered, This is represented by the block immediately above the SEARCH mode block in FIG. 4 which specifies that, if C is greater than E for 4 successive frames, the setting of the E register will be increased by one.

Eventually a condition is reached where the number of errors counted by the C counter is less than or equal to the number stored in the E register, at which time the number counted in the C counter is transferred to the E register and the number (7) stored in the $V_L$ register is transferred to a verify ($V_C$) counter. In brief, the $V_C$ counter keeps track of the number of good sync patterns encountered in the verify length period by counting down one number for each good pattern encountered at window time. This is represented by the logic condition "If $C \leq E@W$, $V_C - 1 \rightarrow V_C$." If the $V_C$ count equals zero, the verify length, as determined by the setting of the $V_L$ register, is increased by one (thus making the next transition from VERIFY to LOCK more difficult) and the lock length setting of the $L_L$ register is transferred to a lock ($L_C$) counter, at which time the transition from the VERIFY to the LOCK mode occurs. While the frame synchronizer is in the VERIFY mode however, the number of actual errors is continuously compared with the number of permissible random errors stored in the E register. If the number of actual errors as counted by the C counter is greater than the setting of the E register at a given window time, the setting of the E register is increased by one and the frame synchronizer remains in the VERIFY mode. This means that the system can tolerate a bad sync pattern and continue to verify that it may be properly synchronized. The frame synchronizer also compares the telemetry signals with the true sync pattern outside of the window time so that if it recognizes a tentative sync pattern at some time other than the window time, it transfers back to the SEARCH mode. This is a condition where the compare count (C) is less than or equal to the setting of the E register at $\overline{W}$ ("not window") time, in which case the C count is transferred to the E register and the verify length is reduced by one (thus making it easier to verify the next time) while the equipment transfers from the VERIFY to the SEARCH mode. As mentioned above, if while in VERIFY, the C count is less than or equal to E at W, the window time, the $V_C$ counter is reduced by one. Typically, if the equipment is truly properly synchronized, the $V_C$ count eventually is reduced to zero, at which time the system transfers to the LOCK mode with the verify length being increased by one, thus making the next verification just a little more difficult, and with the lock length being transferred to the lock ($L_C$) counter.

When in the LOCK mode, the equipment looks at the received telemetry data continuously and responds to bad sync patterns at window time and good patterns at non-window time. If the number counted by the C counter exceeds the number in the E register at window time (the condition "$C > E@W$"), which corresponds to the recognition of a bad sync pattern at the window time or if the C counter number is not greater than the E register number at non-window time (the condition "$C \leq E@\overline{W}$"), corresponding to a good sync pattern at non-window time, the number in the $L_C$ counter is reduced by one. If this condition repeats enough times, the $L_C$ counter eventually reduces to zero, at which time the equipment reverts to the SEARCH mode and the setting of the lock length register is reduced by one, so that the next time the equipment is in the LOCK mode it will more promptly revert to SEARCH if signal quality is poor. If, however, the number of errors counted by the C counter is less than or equal to the setting of the E register at the window time (the condition "$C \leq E@W$"), the setting of the $L_L$ register is transferred to the $L_C$ counter. The effect of this is to require the $L_C$ counter to start over in its countdown to zero of bad sync patterns at the window time. If the number of errors is less than or equal to the setting of the E register at window time for 7 consecutive frames, the equipment stays in the LOCK mode, and the setting of the $L_L$ register is increased by one in order to make it more difficult for the equipment to transfer to the SEARCH mode. This result will be apparent if it is recognized that each time the C counter number is less than or equal to the E reigster number at window time, the $L_L$ number is transferred to the $L_C$ counter. Thus, while good sync patterns are continuously encountered at the window time, the $L_L$ number increases every 7 frames, and the $L_C$ number correspondingly increases. In this fashion the number which controls the duration of the operation in the LOCK mode is continuously varied in accordance with the quality of the received telemetry signals. If the quality of the signals is very good, the $L_L$ number is periodically increased. However, each time the equipment transfers from the LOCK to the SEARCH mode, the $L_L$ number is decreased.

The specific numbers which are indicated in the above description are purely arbitrary and have been specified for this example only.

One particular arrangement in accordance with the invention for performing the functions described in connection with FIG. 4 is shown in block diagram form in FIG. 5. In the frame synchronizer 28 of FIG. 5 input data is shown arriving from the left, as from the bit synchronizer 16 of FIG. 1, where it is entered in a shift register 30. The true sync pattern is shown stored in a stage 32. The electrical conditions of the stages 30 and 32 are continuously compared in a comparison stage 34, the output of which is applied to a correlator 36, which may in one embodiment comprise a suitable resistance network, at the input of a DC amplifier 38. The output of the DC amplifier 38 is applied to a compare (C) counter 40 which counts the errors in each bit time. The output of the C counter 40 is compared in a comparison stage 42 with the output of an error (E) register 44 which contains the number of permissible errors that determines whether or not a given pattern is to be tolerated as the frame sync pattern. If the number C is less than or equal to the number E as determined by the comparison stage 42, a signal is sent therefrom to a logic stage 50, to a verify length counter 52, and to a lock length counter 54. Signals designating the window time which are derived from a frame length counter in the decommutator portion of the stage 18 of FIG. 1 (not otherwise shown) are also applied to the stages 50, 52 and 54. A force-to-search stage is shown connected to the logic stage 50 to initiate operation of the system.

The absence of a signal via the lead 55 corresponds to the condition that C is greater than E. The logic stage 50 controls the equipment in accordance with the various conditions which are encountered in order to determine which of the three modes of operation is maintained at a given time. It also controls an associated indicating panel 56 which has one or another portion illuminated to indicate which of the three modes the equipment is operating in at a given time. The logic stage 50 provides control of a gate 58 connected between the C counter 40 and the random error register 44 so as to transfer the C number to the E register 44 if a "$C \leq E$" signal is encountered on the lead 55. At the same time, the logic stage 50 controls the $V_L$ register 52 to transfer the number stored therein to the counter 60. It should be noted that the counter 60 serves both as the $V_C$ counter and the $L_C$ counter, depending upon whether the equipment is in the VERIFY or LOCK mode, since both $V_L$ and $V_C$ are not employed simultaneously. Thus, the logic stage 50 causes the $V_L$ number to be transferred to the verify/lock counter 60 when C is less than or equal to E while in the SEARCH mode (resulting in a transition from SEARCH to VERIFY), and it causes a transfer of the $L_L$ number to the verify/lock counter 60 when $V_C$ equals 0 in the VERIFY mode (resulting in a transition to the LOCK mode). Thereafter, when the counter 60 counts down to 0 ($L_C=0$), the logic stage 50 controls a gate 62 to pass data from the shift register 30 to the output of the decommutator of stage 18 (FIG. 1).

In the depicted arrangement of the invention, suitable indicators are provided to give an indication of the quality of the signals being received as determined by the settings of the various registers which themselves depend upon signal quality. These are represented in the forms of meters 64, 66 and 68 coupled respectively to the error register 44, the verify length register 52, and the lock length register 54. The meter 64 provides a substantially instantaneous indication of the quality of the signals being received, whereas the meters 66 and 68 provide an indication of the signal quality averaged over a greater period of time, since they are controlled respectively by the settings in the verify length register and the lock length register.

In summary, it will be understood that the E register 44, the $V_L$ register 52 and the $L_L$ register 54 are adaptive counters which hold the standards against which C, $V_C$ and $L_C$ are compared to determine whether or not a mode change is appropriate. This particular arrangement of the frame synchronizer 28 selects for itself the allowable number (E) of error bits in the sync pattern, the number ($V_L$) of good sync patterns before it will advance from the VERIFY to the LOCK mode, and the number ($L_L$) of bad sync patterns it will tolerate before reverting to the SEARCH mode. Furthermore, this arrangement in accordance with the invention operates to alter these three parameters to conform to the quality of the received data. When signal conditions deteriorate, the conditions for determining frame synchronization must be relaxed and, conversely, the conditions for frame synchronization should be tightened for improving signals. The method of synchroniztion provided by the described arrangement of the invention adjusts automatically for changing signal conditions. Therefore, not only does this arrangement of the invention adjust automatically to the condition of the data being processed so that the synchronizer is operating under optimum conditions at all times but the system does this without depending upon a human operator. Thus, the operator may thereby be relieved of the necessity of guessing at the values for the respective parameters and of altering these parameters as the condition of the data varies.

Although there has been described hereinabove one specific arrangement of an automatic frame synchonizer for a sequential information system in accordance with the invention for the purpose of illustrating the manner in which the invention may be used to advantage, it will be appreciated that the invention is not limited thereto. Moreover, although the preferred arrangement of the invention has been shown and described in the context of a telemetry system for monitoring signals from a space vehicle, it should be understood that the invention may have application in other systems which have need for such capabilities and functions. Accordingly, any and all modifications, variations or equivalent arrangements falling within the scope of the the annexed claims should be considered to be a part of the invention.

What is claimed is:

1. An automatic synchronizing device having three operating modes, SEARCH, VERIFY and LOCK, wherein synchronization is achieved by identifying a predetermined code pattern which is part of a cyclic signal sequence, comprising means for comparing received signals with a stored code pattern, an error counter coupled to the comparing means for indicating the degree of correlation between the received signals and the stored pattern, an error register for storing a preset correlation level, means for comparing the output of the error counter with said preset level and for providing a comparison signal in the event that the output of the error counter is less than or equal to said preset level, means for advancing the operating mode from SEARCH to VERIFY upon the occurrence of said comparison signal, a second counter connected to count down from a second preset level each time an acceptable code pattern is detected, means responsive to said second counter for advancing the mode of operation when the count in said second counter is reduced to zero, and means for automatically adjusting the setting of the error register and the initial setting of the second counter in accordance with the quality of the received signals.

2. An automatic synchronizing device in accordance with claim 1 wherein the adjusting means includes a gate for selectively transferring the level of the error counter to the error register upon the occurrence of said comparison signal when the device is operating in the SEARCH mode.

3. An automatic synchronizing device in accordance with claim 2 wherein the adjusting means further includes means for increasing the correlation level in the error register upon the lack of occurrence of said comparison signal for a predetermined number of cycles of the received signals when the device is operating in either the SEARCH or VERIFY modes.

4. A frame synchronizer operable in a selected one of a plurality of modes comprising means for receiving duplicate inputs and providing an output indicative of the correlation between said inputs, means comparing said output with a preset correlation level for providing a comparison signal indicating the magnitude of said output relative to the correlation level, means responsive to said signal for varying said level in accordance with the relative magnitudes of the output and the correlation level, mode transition means for changing the frame synchronizer from a first to a second operating mode upon the occurrence of a predetermined comparison signal, the correlation level being adjusted by the signal responsive means to correspond to the level of said output upon the occurrence of said change, and a counter connected to the comparing means for counting the occurrences of said predetermined comparison signal therefrom at a selected window time in the cycle of a first input to the receiving means and providing a count to the mode transition means, the mode transition means establishing a third operating mode when the counter reaches a first predetermined count level.

5. A frame synchronizer in accordance with claim 4 further including means for controlling said counter to advance its count level in response to predetermined conditions of said comparison signal relative to the selected window time in the cycle of said first input.

6. A frame synchronizer in accordance with claim 5 wherein the counter is arranged to advance its count level when the frame synchronizer is operating in the second operating mode upon the occurrence of a signal from the comparing means indicating that the correlation of the duplicate inputs is better than said preset correlation level at window time.

7. A frame synchronizer in accordance with claim 6 wherein the mode transition means is arranged to advance the operating mode from the second to the third operating mode when the count level of said counter reaches a first predetermined value, and further including means for varying said first predetermined value in accordance with the degree of correlation of said inputs.

8. A frame synchronizer in accordance with claim 4 further including means connected between the counter and the mode transition means for storing said predetermined count level, and means for varying the level stored in said storing means in accordance with the signal quality of at least one of said duplicate inputs.

9. A frame synchronizer in accordance with claim 8 further including indicating means connected to said storing means for indicating the level stored therein.

10. A frame synchronizer operable in a selected one of a plurality of modes comprising means for receiving duplicate inputs and providing an output indicative of the correlation between said inputs, means comparing said output with a preset correlation level for providing a comparison signal indicating the magnitude of said output relative to the correlation level, means responsive to said signal for varying said level in accordance with the relative magnitudes of the output and the correlation level, and mode transition means for changing the frame synchronizer from a first to a second operating mode upon the occurrence of a predetermined comparison signal, the mode transition means including means for reverting from the second to the first operating mode upon the occurrence of said predetermined comparison signal at any time in the cycle of a first input to the receiving means other than a selected window time, the correlation level being adjusted by the signal responsive means to correspond to the level of said output upon the occurrence of said reversion.

11. A frame synchronizer in accordance with claim 5 wherein the counter controlling means is arranged to advance the count level when the frame synchronizer is operating in the third operating mode upon the occurrence of a signal from the comparing means indicating that the correlation of the inputs is worse than said preset correlation level at window time and also upon the occurrence of a comparison signal indicating the correlation of said inputs is better than said preset correlation level at a time outside of window time.

12. A frame synchronizer in accordance with claim 11 wherein said mode transition means is arranged to change the operating mode of said frame synchronizer from said third operating mode to said first operating mode upon the count level of said counter reaching a second predetermined value, and further including means for varying said second predetermined value in accordance with the degree of correlation of said inputs.

13. An automatic frame synchronizer for controlling a decommutator for processing received data signals occurring in repetitive sequences of a predetermined sync pattern followed by a series of randon data, the synchronizer comprising a comparison device for comparing received data with a reference sync pattern, an error counter for indicating the errors detected between said received data and the reference sync pattern, an error register for storing an acceptable error number to determine the recognition of received data as corresponding to said sync pattern, comparison means coupled between said error counter and said error register for providing an output signal when the counted errors are less than or equal to the acceptable error number, whereby said frame synchronizer is transferred from the SEARCH to the VERIFY mode if it had previously been in the SEARCH mode, a second counter for counting the recognitions of acceptable synchronization patterns in the received data at a selected window time in the sequence of said data, means responsive to the second counter for transferring the frame synchronizer from the VERIFY to the LOCK mode upon the recognition of a particular number of acceptable sync patterns at window time, said second counter also being operable to count the combination of recognitions of unacceptable sync patterns at window time and recognitions of acceptable sync patterns outside the window time when the frame synchronizer is in the LOCK mode, means responsive to the second counter for transferring the frame synchronizer from the LOCK to the SEARCH mode when the second counter reaches preset count level, means for transferring the frame synchronizer from the VERIFY to the SEARCH mode upon the recognition of an acceptable sync pattern outside the window time when the frame synchronizer is in the VERIFY mode, and means for automatically varying the levels stored in the error register and in the second counter in accordance with the quality of the data signals being received.

References Cited

UNITED STATES PATENTS 2,527,638 10/1950 Kreer et al. ---------- 179—15

3,065,302 11/1962 Kaneko ------------ 179—15
3,144,515 8/1964 Kaneko ------------ 179—15
3,188,569 6/1965 Mahany ------------ 179—15

OTHER REFERENCES

IBM Technical Disclosure Bulletin, E. F. Yhap and W. G. Strohm, Synchronization Device for Remote Multiplexing System, vol. 6, No. 7, pp. 80–82, December 1963.

RICHARD MURRAY, Primary Examiner

C. R. VONHELLENS, Assistant Examiner

U.S. Cl. X.R.

178—53, 69.5; 325—4, 58